United States Patent [19]

Negwer

[11] Patent Number: 5,458,984
[45] Date of Patent: Oct. 17, 1995

[54] JOURNAL BEARING WITH BONDED LINER

[75] Inventor: Bernd Negwer, Andernach, Germany

[73] Assignee: Renk Aktiengesellschaft, Augsburg, Germany

[21] Appl. No.: 172,488

[22] Filed: Dec. 22, 1993

[30] Foreign Application Priority Data

Dec. 23, 1992 [DE] Germany ............... 42 43 980.9

[51] Int. Cl.$^6$ ................... B22F 7/00; C22C 1/04
[52] U.S. Cl. ............ 428/547; 428/550; 427/448; 427/456
[58] Field of Search .............. 428/547, 548, 428/550, 553, 554, 555; 427/446, 448, 455, 456; 419/5

[56] References Cited

U.S. PATENT DOCUMENTS

| | | | |
|---|---|---|---|
| 3,936,295 | 2/1976 | Cromwell et al. | 75/0.5 R |
| 4,420,543 | 12/1983 | Kondo et al. | 428/564 |
| 4,435,482 | 3/1984 | Futamura et al. | 428/553 |
| 4,818,628 | 4/1989 | Alexander et al. | 428/561 |
| 4,900,639 | 2/1990 | Hodes et al. | 428/610 |
| 4,904,537 | 2/1990 | Lytwynec | 428/548 |
| 4,999,257 | 3/1991 | Imai | 428/555 |
| 5,087,529 | 2/1992 | Engel et al. | 428/552 |
| 5,328,772 | 7/1994 | Tanaka et al. | 428/548 |

FOREIGN PATENT DOCUMENTS

| | | |
|---|---|---|
| 0120553 | 1/1984 | European Pat. Off. . |
| 826057 | 12/1959 | United Kingdom . |
| 1098361 | 1/1968 | United Kingdom . |
| 1378743 | 12/1974 | United Kingdom . |
| 1598361 | 9/1981 | United Kingdom . |

OTHER PUBLICATIONS

*Metals Handbook*, 9th ed., vol. 5, ASM International, USA, pp, 365–368.

Primary Examiner—Donald P. Walsh
Assistant Examiner—Scott T. Bluni
Attorney, Agent, or Firm—Natter & Natter

[57] ABSTRACT

A journal bearing assembly includes a steel bearing body and a Babbitt metal liner which defines an internal bearing surface and provides a sliding bearing for a rotating journal. A porous metal bonding layer of NiAl 80/20 or AlSi 12 is applied between the bearing body and the liner. The bonding layer is spray deposited onto the bearing body and the liner is spray deposited onto the bonding layer. The liner is most porous at the bonding layer interface with decreasing porosity toward the bearing surface. The bonding layer may be flame sprayed or applied in powder form and fused. Similarly, the liner may be flame sprayed or applied in powder form and fused.

25 Claims, 1 Drawing Sheet

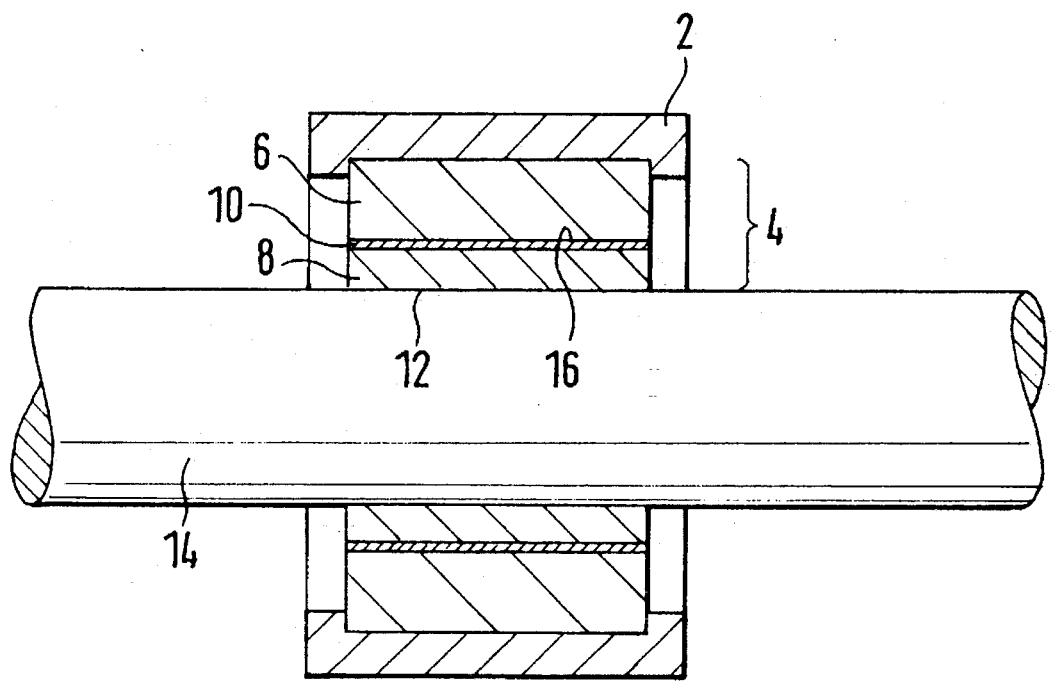
FIG.

5,458,984

JOURNAL BEARING WITH BONDED LINER

BACKGROUND OF THE INVENTION

1. Field of the Invention

This invention relates generally to sleeve or journal bearings and more particularly to a journal bearing having a bearing body and a liner bonded to the body.

2. Related History

Sleeve or journal bearings have been employed to support rotating shafts or journals. In some bearings, a separate insert or bushing was provided to form a bearing surface. The bearing bushings were press fit into a bearing housing. In other instances, such as when a rotating shaft or journal carried significant axial loads, journal bearings were formed with a steel or bronze body having a thin liner of Babbitt metal or other bearing alloy. Such bearings were fabricated either completely around to circumscribe the shaft or journal or were split along an axial plane.

Among the requirements for bearing liner alloys were load carrying capacity, low coefficient of friction, smoothness of bearing surface, thermal conductivity, wear resistance, fatigue resistance and corrosion resistance.

Both tin based and lead based Babbitt bearing metals have been extensively used. Among the characteristics which rendered Babbitt metal suitable for bearing applications were the ability to run in quickly and to develop a smooth bearing surface. Additionally, Babbitt metal bearings were able to conform, i.e. adapt to shaft misalignment or shaft deflection and also had the attribute of imbedability, that is, a reasonable amount of foreign matter or dirt in the lubricant could be absorbed by the soft bearing material and the shaft was thus protected against scoring.

Babbitt metal has been applied as a cast in place bearing liner within a steel bearing body. To fabricate the bearing, annular grooves were formed in the bearing body and the Babbitt metal liner was cast in place. The Babbitt metal filled the grooves to lock the liner in place. This fabrication technique was relatively costly.

In addition to casting, flame or arc spray techniques for applying Babbitt metal as a bearing liner have been employed. Such techniques were utilized for applying additional liner metal to effect a repair. The bearing metal which was spray deposited provided a coating with large pores and oxide inclusions, as a result, the repaired bearing was unable to withstand the original bearing stress loads. Repaired bearings were thus utilized on applications wherein stress loads were reduced to between 50% to 70% of original specified stress.

In the case of new bearings, Babbitt metal has been applied by flame or arc spray over a steel bearing body which, like the bearing body for a cast liner, included grooves for the purpose of anchoring the liner to the body. The grooves were in the order of 0.1 to 1.0 mm deep and the inner surface of the bearing body was coated with spray deposited Babbitt metal which anchored itself into the grooves.

When tin based Babbitt metal was employed in this technique, the copper-tin compounds contained therein solidified in finely crystalline form and the formation of pores in the deposited lining was unavoidable.

Because grooves were required to be formed in the bearing body for proper adhesion, ultrasonic testing of the bond strength between the liner and the steel bearing body was precluded due to diversion and interference of the ultrasonic waves by the grooves.

Attempts have been made to adhere a spray deposited Babbitt metal liner to a steel bearing base by first tinning the surface of the bearing base. A tinned interface of FeSn or $FeSn_2$ was formed and a bearing liner of Babbitt metal was thereafter spray deposited. Unfortunately, this technique was not suitable for producing new bearings because the quality of adhesion was inconsistent and was generally insufficient. Consequently, this technique was relegated to the repair of damaged portions of existing bearing liners.

SUMMARY OF TEE INVENTION

A journal bearing is formed with a steel bearing body and a spray deposited liner formed of a suitable bearing metal. In order to assure adhesion between the bearing metal liner and the bearing body, an intermediate layer of bonding material such as NiAl 80/20 or AlSi 12 is spray deposited over the inner surface of the bearing base. Flame or arc spray or powder deposit and sintering methods may be employed. It is desireable to assure that the bonding layer solidifies on the bearing body in a porous state.

A lining of bearing metal, e.g. Babbitt metal, is spray deposited onto the bearing body and over the bonding layer. Preferably, the bearing metal is flame sprayed or applied in powder form and then sintered with the liner being most porous at the interface with the bonding layer and have decreasing porosity toward the bearing surface.

From the foregoing compendium, it will be appreciated that it is a consideration of the present invention to provide a journal bearing with a bonded liner of the general character described which is not subject to the disadvantages of the related history aforementioned.

A feature of the present invention is to provide a journal bearing with a bonded liner of the general character described wherein a bearing liner is spray deposited on a bearing base to furnish a durable and tenacious bond between the base and the liner.

An aspect of the present invention is to provide a journal bearing with a bonded liner of the general character described wherein the adhesion between a spray deposited bearing liner and a bearing base may be tested for uniformity with ultrasonic testing techniques.

To provide a journal bearing with a bonded liner of the general character described which is relatively low in cost and high in quality is yet another consideration of the present invention.

A further aspect of the present invention is to provide a journal bearing with a bonded liner of the general character described which includes a bearing body, a spray deposited intermediate bonding layer applied to the bearing base and a spray deposited bearing metal liner.

Yet another feature of the present invention is to provide a journal bearing with bonded liner of the general character described which includes a bearing body, an open cell porous metal bonding layer applied to the bearing body and a liner of bearing metal applied to the bonding layer, with the bearing metal being open cell porous structure at least in the area in contact with the bonding layer.

To provide an economic method of mass production fabrication of journal bearings with bonded liners of the general character described which assures the production of uniform quality bearings is yet another feature of the present invention.

A still further aspect of the present invention is to provide a low cost method of fabricating a journal bearing of the general character described.

Other aspects, features and considerations of the present invention in part will be obvious and in part will be pointed out hereinafter.

With these ends in view, the invention finds embodiment in certain combinations of elements, arrangements of parts and series of steps by which the aspects, features and considerations aforesaid and certain other aspects, features and considerations are attained, all with reference to the accompanying drawing and the scope of which will be more particularly pointed out and indicated in the appended claims.

BRIEF DESCRIPTION OF TEE DRAWING

In the accompanying drawing in which is shown one of the various exemplary embodiments of the invention, the drawing FIGURE comprises a longitudinal sectional view through a journal bearing with a bonded liner constructed in accordance with and embodying the invention and showing a bearing base, a spray deposited porous bonding layer, a spray deposited bearing liner and a rotating shaft or journal, carried in the bearing.

DESCRIPTION OF THE PREFERRED EMBODIMENT

Referring now in detail to the drawing, the reference numeral 4 denotes generally a journal bearing constructed in accordance with and embodying the invention. The bearing 4 includes a cylindrical bearing body 6 formed of a durable metal, such as steel, e.g. C-10 steel, and a cylindrical bearing liner 8, formed of a suitable bearing metal such as Babbitt metal and having a bearing surface 12. The bearing surface 12 may be finished by turning in a lathe, grinding, honing or in any other conventional manner. A porous intermediate bonding layer 10 formed of a metal alloy is positioned between the bearing body 6 and the bearing liner 8.

The bearing body 6, bonding layer 10 and liner 8 are carried as a unit within a bearing cup 2. The journal bearing 4 may be formed in a split fashion, that is may be formed of two halves, joined together along an axial plane.

Although not illustrated, a suitable lubricating system for the delivery of oil to the interface between the bearing surface 12 and a rotating journal 14, including, for example, conventional oil grooves, may be provided.

In accordance with the invention, the bonding layer 10 is applied to an inner cylindrical surface 16 of the bearing body by a spray depositing technique and the bearing liner 8 is applied to the bonding layer 10 by a spray depositing technique. The bearing liner 8 and the bonding layer 10 are joined to each other simultaneously during the spray procedure or subsequently by heat treatment.

Among the spray deposit techniques which may be utilized are depositing the material of the bonding layer and/or bearing liner in powder form and subsequently fusing. Alternately, the material of the bonding layer 10 and/or bearing liner 8 can be applied by wire flame spraying.

Prior to depositing the bonding layer 10 on the inner cylindrical surface 16 of the bearing body 6, the surface 16 is first smoothed and then roughened by steel shot under pressure to a surface roughness in a range between an Ra=2.0 and 15/um/Rz. Successful results have been obtained utilizing pure martensitic steel shot with edges and having a hardness of at least 64 HRC (type GH) to achieve the desired surface roughness. Satisfactory results have been achieved utilizing any of the following bearing metals for the bearing liner 8:

(a) a tin based Babbitt metal, referred to as White Metal and available under the designation Therm 89 comprising the following constituent elements:

Sn 88%–90%

Cu 3%–4%

Sb 7%–8%

As 0.1%

Pb 0.06%, and a remainder of conventional constituents in conventional amounts as would be familiar to those skilled in the art, (b) a lead based Babbitt metal known under the designation "White Metal WM 10" and "Lg Pb Sn 10" and comprising the following constituent ingredients:

Sn 9.5%–10.5%

Cu 0.5%–1.5%

Sb 14.5%–16.5%

Pb 72.5%–74.5%

Fe approx. 0.1%

Zn approx. 0.05%

Al approx. 0.05%

(0.15% maximum of combined Fe, Zn and Al) and possibly a remainder of conventional constituents in conventional amounts as would be familiar to those skilled in the art.

(c) a bearing metal comprising the following constituent ingredients:

Sn 5%–7%

Cd 0.6%–1.2%

Cu 0.8%–1.2%

Sb 14%–16%

Ni 0.2%–0.5%

As 0.2%–0.8%

Pb 20%–26% and a remainder of conventional constituents in conventional amounts as would be familiar to those skilled in the art, (d) a bearing metal may comprise the constituents of the prior examples in quantities within the ranges provided in the prior examples.

The bonding layer 10 may comprise or include a metal and, pursuant to the invention, should achieve a bond strength relative to the bearing body 6 as well as relative to the bearing liner 8 greater than 15 MPa. Preferably, the mutual bond strength should be greater than 20 MPa.

Among the metal suitable for application as a bonding layer metal are AlSi 12 and NiAl 80/20. Utilizing a bonding layer of NiAl 80/20 together with a bearing liner metal of Therm 89, both spray deposited in accordance with the present invention, a mutual adhesion of the layers with a bond strength of 21 MPa and 26 MPa was obtained.

Among the advantages of the present invention is that it enables a journal bearing 4 to be constructed with a bearing liner 8 of substantial thickness, e.g. greater than 1 cm with a relatively thin bonding layer from a few nm up to, for example, one mm. Thus, it is well within the present invention to provide a bearing lining which is easily twice as thick as the bonding layer.

As previously discussed, the method of fabricating a journal bearing 4 with a bonded liner 8 in accordance with the invention includes the steps of forming on a bearing body 6, a bonding layer of NiAl 80/20 or AlSi 12 or of a metal composition or alloy having similar bonding properties by spray depositing. The method also includes forming, on the bonding layer 10, by spray depositing the bearing liner 8 of a suitable bearing metal, such as the bearing metals disclosed. It has been found that the bonding layer metal and the bearing liner metal can be sprayed on and heat treated, either by spraying in the form of powders and then applying heat for fusing or by forming the layers by wire flame spraying.

It has also been found that the entire bearing body 6 need not be heated all at once to effect the proper fusing of the coating and lining metals, that is, the bearing body 6 can be heated only in a small area to which the bonding layer metal is first deposited and, immediately thereafter, the bearing liner metal is deposited. The heat source is moved across the entire bearing body surface to be coated and the application of the bonding metal and liner metal thereafter progressively follows.

A subsequent additional application of heat to the bonding layer or the bearing liner is possible, but is not normally necessary. The advantage achieved by the foregoing procedure is that heat distortion of the bearing body 6 is significantly reduced.

As previously mentioned, prior to application of the bonding layer 10, the inner surface 16 of the bearing body 6 is first smoothed and then roughened by steel shot with the preferred steel shot being pure martensitic with edges and a hardness of at least 64 HRC (type GH).

A further aspect of the present invention resides in the manner in which the bonding layer and the bearing layer are applied with a bearing liner porosity gradient extending radially inwardly toward the bearing surface 12.

It has been found that the liner metal should be applied in a manner such that the depositing layer is both thin and significantly open cell porous. The overlying bearing liner is deposited in a manner such that the bearing liner is relatively open cell porous at the interface with the bonding layer and, thereafter, the bearing liner is applied with graduated porosity such that the portions of the bearing liner at or adjacent the bearing surface 12 are denser and less porous than those portions at the bonding layer interface.

At bearing surface 12, the bearing liner 8 should be relatively dense, that is, of low porosity, and should have a pore size in the order of a few, e.g. up to 5, micrometers or less. The pores at the bearing surface 12 will fill with lubricating oil to facilitate an oil film interface between the bearing surface 12 and the rotating journal 14. If a non-porous bearing surface is utilized, alternate lubrication systems may be required. Preferably, the porosity of the bonding layer 10 is greater than the porosity of the bearing liner deposited at the bonding layer interface. Among the flow rates utilized for spray depositing the bearing liner are between 105 to 110 G/Min.

In accordance with the invention, bearing liners 8 have been provided without any oxide inclusions and with only small pores of but a few micrometers at the bearing surface 12. Thus, there is no impairment of load carrying capacity as was previously encountered with spray deposited bearing liner repairs which suffered from oxide inclusions and large pores.

The following is a history of the development of the optimal embodiment of the invention.

A bearing body 6 of C-10 steel was employed with its inner surface prepared by the pressure steel shot method (not corundum). Martensetic edgy steel shot of a hardness equal to or greater than 64 HRC (GH type) was employed for surface treatment by blasting. A roughness of Ra=7.6/um/z=48.6/um/Rmax=67.1/um was achieved.

By contrast, surfaces blasted with corundum achieved roughness values of Ra=2.7/um/Rz=20.5/um/Rmax=25.4/um. The steel shot produced a similar roughness profile than corundum but with substantially greater roughness. The blasted surfaces illustrated a roughness generated with steel shot having longer waves and fewer undercuts.

The tin based Babbitt metal alloy, Therm 89, was employed for the bearing liner 8 with an initial minimal porosity and a desired bonding strength RH-Gn to be equal to or greater than 20 MPa per DIN 50160 B for a 5 mm liner thickness; plastic deformation of the surfaces at the rim areas was permissible.

With respect to the criteria for the bonding layer 10, among such criteria were the requirement of application in powder form or by wire flame spraying, the desired adhesion of greater than 20 MPa and the possibility of mechanical processing by turning (for Chalmers test). Among the various bonding metals subjected to a tension test for adhesion per DIN, both NiAl 80/20 and AlSi 12 were found well suited.

Tests did reveal, however, an unacceptable separation between the bonding layer 10 and the bearing liner 8 and a Therm 89 bearing liner 8.

In order to improve adhesion, several measures were attempted including:

(1) coating with reduced flame when flame spraying,
(2) utilizing compressed air during the coating step to remove dust,
(3) depositing the bearing liner with graduated porosity,
(4) providing a thinner bonding layer, and
(5) providing a more porous bonding layer.

As a result of such measures, it was found that by flame spraying a thin, slightly porous bonding layer 10 which is thinner than the bearing liner 8 and by using a reduced flow rate when flame spraying first and second plies or layers of the bearing liner 8 onto the bonding layer 10, followed by further plies or layers of the bearing liner metal which are flame sprayed at a higher material flow rate, sufficient adherence between the bearing body 6, the bonding layer 10 and the bearing liner 8 is achieved. At the same time, a bearing liner 8 of graduated porosity or density is formed.

The reduced material flow rate when forming the initial plies or layers of the bearing liner 8 produces a somewhat porous structure in the region of the bearing liner which is at the interface with and adjacent the bonding layer. The radially inner plies or layers of the bearing liner 8 are applied at increased material flow rates and are thus less porous.

The porous structure of the flame sprayed bonding layer, which is preferably thinner and more porous and of rougher texture than the plies or layers of the bearing liner at the bonding layer interface, result in a favorable internal stress relationship (internal mechanical tension) to provide a sufficient and satisfactory bond strength of more than 20 MPa.

In the plies or layers of the bearing liner 8 at the bonding layer interface and adjacent the interface, the flame spray material feed rate of bearing metal was reduced, however, in the radially inner layers of the bearing liner, approaching the bearing surface 12, flow rate was not reduced and a denser, less porous bearing liner structure resulted.

To produce journal bearings in accordance with the production, a bearing liner metal application output of 105–110 g/min (0.21 mm per sprayed layer) can be utilized. The bearing liner material consumption may range between 220 and 230 g/min corresponding to a wire feed of 400 cm/min.

By preheating the bearing body surface with a burner, and utilizing a bonding material of NiAl 80/20 and a bearing liner of Therm 89, both flame sprayed, adequate bond strength in the range of 21 to 26 MPa was always achieved.

A further aspect of the invention resides in the relationship between the bearing liner thickness and the bond strength. It was found that a bearing liner of up to more than 1 cm in thickness is possible without impairment of the bond tensile strength. With bearing liners having thicknesses between 2 mm and 7 mm, the DIN bond tensile strength actually rose with increasing thickness.

Thus it will be seen that there is provided a journal bearing with a bonded liner which achieves the various aspects, features and considerations of the present invention and which is well adapted to meet the conditions of practical usage.

As various changes might be made in the invention as above set forth without departing from the spirit of the invention, it is to be understood that all matter herein described or shown in the accompanying drawing is to be interpreted as illustrative and not in a limiting sense.

Having thus described the invention, there is claimed as new and desired to be secured by Letters Patent:

1. A journal bearing comprising a bearing body, a bearing liner and bonding layer means for bonding the bearing liner to the bearing body, the bonding layer means being positioned between the bearing body and the bearing liner, the bearing liner defining a bearing surface configured to receive a journal, the bearing liner comprising a bearing metal spray deposited on the bonding layer means, the bearing liner being of open cell porous structure at least on its surface interfacing with the bonding layer means and having decreasing porosity and increasing density in a radially inward direction toward the bearing surface.

2. A journal bearing constructed in accordance with claim 1 wherein the bearing liner is spray deposited by flame spraying.

3. A journal bearing as constructed in accordance with claim 1 wherein the bonding layer means is applied to the bearing body by spray deposit and is of open cell porous structure.

4. A journal bearing as constructed in accordance with claim 3 wherein the bonding layer means is spray deposited on the bearing body by flame spraying.

5. A journal bearing as constructed in accordance with claim 1 wherein the bearing liner is thicker than the bonding layer means, the bearing liner being at least twice as thick as the bonding layer means.

6. A journal bearing as constructed in accordance with claim 1 wherein the bearing liner is configured with a pore size, at the bearing surface, in the order of micrometers.

7. A journal bearing constructed in accordance with claim 1 wherein the thickness of the bonding layer means is in the order of 1 mm and the thickness of the bearing liner is in the order of 1 cm.

8. A journal bearing constructed in accordance with claim 1 wherein the bonding layer means is selected from the group consisting of NiAl 80/20 and AlSi 12.

9. A journal bearing as constructed in accordance with claim 1 wherein the bearing metal is selected from the group consisting of:

(a) a tin based Babbitt metal comprising
   Sn 88%–90%
   Cu 3%–4%
   Sb 7%–8%
   As 0.1%
   Pb 0.06%
   and a remainder of conventional constituents in conventional amounts, (b) a lead based Babbitt metal comprising
   Sn 9.5%–10.5%
   Cu 0.5%–1.5%
   Sb 14.5%–16.5%
   Pb 72.5%–74.5%
   Fe approx. 0.1%
   Zn approx. 0.05%
   Al approx. 0.05%,
   (0.15% maximum of combined Fe, Zn and Al) and a remainder of conventional constituents in conventional amounts, (c) a bearing metal alloy comprising
   Sn 5%–7%
   Cd 0.6%–1.2%
   Cu 0.8%–1.2%
   Sb 14%–16%
   Ni 0.2%–0.5%
   As 0.2%–0.8%
   Pb 20%–26%
   and a remainder of conventional constituents in conventional amounts and (d) the constituents of (a), (b) and (c) in quantities within the ranges provided in (a), (b) and (c).

10. A journal bearing as constructed in accordance with claim wherein the surface of the bearing body in contact with the bonding layer means has a surface roughness in the range of between Ra=3.5 and 10/um/Rz.

11. A journal bearing as constructed in accordance with claim wherein the bearing body is formed of C-10 steel.

12. A journal bearing as constructed in accordance with claim 1 wherein the bearing metal is spray deposited in powder form and fused.

13. A journal bearing as constructed in accordance with claim 4 wherein the bonding layer is spray deposited in powder form and fused.

14. A journal bearing as constructed in accordance with claim 3 wherein the bearing liner at the surface interfacing the bonding layer means is less porous than the bonding layer means.

15. A method for fabricating a journal bearing constructed in accordance with claim 1, the method comprising the steps of:

(a) depositing the bonding layer means onto the bearing body in an open cell porous configuration, (b) spray depositing the bearing liner onto the bonding layer means at an application rate which provides an open cell porous bearing liner configuration at the interface with the bonding layer means, and (c) building up layers of spray deposited bearing liner at an increased flow rate to provide decreasing porosity and increasing density of the bearing liner in a radially inward direction.

16. A method in accordance with claim 15 wherein the layers of the bearing liner are spray deposited by flame spraying.

17. A method of forming a journal bearing having a bonded bearing liner, the method comprising the steps of:

(a) providing a bearing body, (b) spray depositing an open cell porous bonding layer on the bearing body, (c) spray depositing a bearing metal on the open cell porous bonding layer at an application rate which provides an open cell porous configuration at the interface with the boding layer, and (d) building up layers of spray deposited bearing liner at an increased flow rate to provide decreasing porosity and increasing density of the bearing liner in a radially inward direction to form a bearing liner.

18. A method of forming a journal bearing having a boded bearing liner as set forth in claim 17, further including the step of roughening the bearing body to a surface roughness in a range between Ra=2.0 and 15/um/Rz prior to depositing the bonding layer on the bearing body.

19. A method of forming a journal bearing having a bonded bearing liner as set forth in claim 18 wherein the step of roughening the bearing body includes blasting the bearing body with martensitic steel shot of a hardness at least equal to 64 HRC.

20. A method of forming a journal bearing having a bonded bearing liner in accordance with claim 17 wherein the bearing metal is spray deposited in powder form, the method further including the step of fusing the spray deposited bearing metal.

21. A method of forming a journal bearing having a bonded bearing liner in accordance with claim 17 wherein the bonding layer is spray deposited in powder form, the method further including the step of fusing the spray deposited bonding layer.

22. A method of forming a journal bearing having a bonded bearing liner in accordance with claim 17 wherein the bearing metal is spray deposited by flame spraying.

23. A method of forming a journal bearing having a bonded bearing liner in accordance with claim 17 wherein the bonding layer is spray deposited by flame spraying.

24. A method of forming a journal bearing having a bonded bearing liner in accordance with claim 17 further including the step of heating the bearing body prior to depositing the bonding layer and the bearing metal, the step of heating including the step of applying a heat source to an initial area of the bearing body and thereafter moving the heat source to a further area of the bearing body with the steps of spray depositing the bonding layer and spray depositing the bearing metal taking place on the heated areas only and following the application of the heat source.

25. A journal bearing comprising a bearing body, a bearing liner and bonding layer means for bonding the bearing liner to the bearing body, the bonding layer means be positioned between the bearing body and the bearing liner, the bearing liner defining a bearing surface configured to receive a journal, the bearing liner comprising a Babbitt metal and the bonding layer means comprising a metal selected from the group consisting of NiAl 80/20 and AlSi 12, the bearing liner being spray deposited on the bonding layer means, the bond strength between the bearing liner and the bearing body bearing at least 20 MPa, the bearing liner being of open cell porous structure at least on its surface interfacing with the bonding layer means.

* * * * *